United States Patent Office 3,194,680
Patented July 13, 1965

---

3,194,680
PROCESS FOR THE PRODUCTION OF SILOXANE-COATED SEPARATING PAPER
Klaus Damm, Cologne-Flittard, Germany, and Hans-Engelbert Göttgens, Thal, Sankt Gallen, Switzerland, assignors to Farbenfabriken Bayer Aktiengesellschaft, Leverkusen, Germany, a corporation of Germany
No Drawing. Filed Apr. 13, 1962, Ser. No. 187,217
Claims priority, application Germany, Apr. 25, 1961,
F 33,750
5 Claims. (Cl. 117—155)

The invention relates to an improvement in the coating of paper with organosiloxanes.

Paper which is coated with organopolysiloxanes is known to be used as separating paper for many purposes of technical importance, inter alia for covering adhesive foils. Elastic essentially linear organopolysiloxanes as well as resinous organopoly-siloxanes have been proposed for this purpose. Linear siloxanes yield outstanding separating properties, but do not adhere sufficiently to the paper. Siloxane resins, on the other hand, adhere very well but their separating effect is unsatisfactory. Moreover, a siloxane resin coating is too stiff and brittle for most purposes so that the coating often cracks, for example when folding the paper. In contact with adhesive foils, siloxane resins show only a slight influence on the adhesive substance, whilst linear organopolysiloxanes, even in the vulcanized state, swell in contact with almost all known adhesive substances and, possibly due to the migration of low-polymeric portions into the adhesive substance, strongly reduce its adhesiveness.

Furthermore, mixtures of linear and resin-like cross-linked organopolysiloxanes have been proposed for the coating of paper. However, mixtures of this type still exhibit the aforesaid disadvantageous properties of both components in accordance with their proportion used. In particular, the elasticity of such mixtures is unsatisfactory according to the amount of resinous siloxane admixed to it.

According to the invention it is possible to produce paper coatings which are elastic, adhere excellently to paper and have practically no influence on the adhesive substance when in contact with an adhesive foil, by admixing to a known mixture of an essentially linear organopolysiloxane containing terminal hydroxyl groups and of a resinous-like cross-linked organopolysiloxane, a boron compound as further component and, after the addition of a conventional hardening catalyst, hardening the paper coated with this mixture by heating it, normally to temperatures between 100 and 150° C. for a few minutes. Suitable boron compounds are boric acid, its anhydride and its alkyl derivatives such as boric acid alkyl esters, alkyl-boric acid alkyl esters $R''_aB(OR''')_{3-a}$ and alkyl-boroxoles $(R''BO)_3$ ($R''$ and $R'''$ being lower alkyl radicals, $a=1$ or 2). The alkyl derivatives generally dissolve immediately in the siloxane mixtures and are therefore to be preferred. Boron oxide and boric acid necessitate heating of the mixture, prior to the addition of the hardening catalyst, to temperatures between 80 and 150° C. until dissolved. The proportion of boron compound amounts to between 0.1 and 10, preferably between 1 and 5 percent of the total weight of organosiloxane.

The essentially linear organopolysiloxanes to be used in this process are known. They contain at the chain ends hydroxyl groups linked with silicon and moreover correspond to the general formula

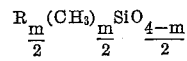

wherein each R denotes a hydrogen atom or a hydrocarbon radical and $m$ is a number between 1.9 and 2.1. Accordingly, a minor portion of mono- or trifunctional siloxane units may be present in addition to the bifunctional units. These siloxanes are obtainable in known manner, for example directly from organochlorosilanes by hydrolysis or from organo-cyclosiloxanes by polymerization with an acid or alkali metal hydroxide. Their degree of polymerization and thus their viscosity may be chosen within wide limits. The low-viscous polymers penetrate more deeply into the paper and require longer drying times; the long-chain polymers tend to form films on the surface of the paper.

The resinous organo-polysiloxanes to be used as second siloxane component are likewise known. They are polymers of the general formula

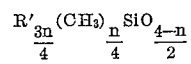

wherein each R' denotes a hydrocarbon radical and $n$ is a number between 0.5 and 1.5. They are produced in known manner, for example by hydrolysis of mixtures of various organo-chlorosilanes $R'_xSiCl_{4-x}$ ($x=0$ to 3). The proportion of linear to resinous siloxanes may be chosen between 70:30 and 1:99.

The catalysts usually employed for curing such siloxane mixtures comprise for example simple metal salts such as salts of higher carboxylic acids of lead, cobalt, zinc, manganese, zirconium, cerium and tin; organo-metallic compounds such as dibutyl-tin-dilaurate, dioctyl-tin-dimaleate; amines such as butylamine, dibutylamine; quaternary ammonium salts such as choline octoate, tetramethyl-ammonium acetate; organic peroxides such as benzoyl peroxide. Their proportion may amount to between 0.1 and 10 percent of the organosiloxane weight.

The mixture according to the invention is applied in known manner either by dissolving it in suitable organic liquids and applying the solution to the paper by spraying or dipping in conventional coating devices expediently devised for recovery of the solvent, or by preparing an aqueous emulsion from the mixture. Conventional emulsifiers for polysiloxanes can be used for this purpose, for example polyethylene glycols, morpholine oleate, cellulose ethers, polyvinyl alcohol or polyacrylamide. In this case the process can be carried out by spraying the paper web with the emulsion and squeezing it in a sizing press, the excess emulsion running back into the sizing vat from where it is sprayed again with the aid of a pump. The paper coated in the sizing press is subsequently dried. For coating parchment paper which, following the neutralization bath, is sprayed in this manner, squeezed between rollers and dried, conventional plasticizers such as glycerol, sorbital, or sugar may be added to the emulsion according to the invention.

A number of advantages is achieved by the addition of boron to the siloxane mixtures according to the invention. The elasticity of the coated paper is essentially improved compared with paper treated without boron. At the same time the hardening period is shortened. The main advancement, however, lies in the aforesaid property of the coating according to the invention when in contact with the adhesive substance of adhesive foils whose adhesive power remains practically unimpaired whereas it is substantially reduced without the addition of boron.

The following examples are given for the purpose of illustrating the invention.

*Example 1*

An α,ω-dihydroxy-polyphenyl methyl siloxane of approximately 20,000 cs. viscosity (20° C.) is prepared in known manner by polymerization of a mixture of 95 parts by weight of octa-methyl-cyclotetrasiloxane and 5 parts by weight of octa-phenyl-cyclotetrasiloxane with 0.01 part by weight of KOH. Furthermore, there is prepared in known manner by hydrolysis from a mixture of 90 parts by weight of methyl trichlorosilane and 10 parts by weight of dimethyl dichlorosilane a methyl polysiloxane resin which is dissolved in an equal amount of toluene. A quantity of this solution containing 70 parts by weight of the resin is mixed with 30 parts by weight of α,ω-dihydroxy-polyphenyl methyl siloxane and 3 parts by weight of propylboric acid di-n-amyl ester, the mixture is diluted with toluene to an organosiloxane content of 10 percent by weight, and 3 parts by weight of dibutyl-tin-dilaurate are added thereto.

For the coating of paper such as parchment paper, imitation parchment paper, soda kraft paper, the latter is dipped into the solution obtained or the solution is poured over the paper; the excess solution is then allowed to drip off or it is squeezed off between rollers and the paper is subsequently dried at temperatures between 120 and 130° C. for about 2 to 3 minutes.

The siloxane coating thus obtained is so flexible that the paper can be folded without damage. An adhesive foil of the type known on the market for example under the designation Nadir® band and Tesafilm® pressed on this paper shows no noticeable reduction of its initial adhesive power after removal of the paper.

*Example 2*

By polymerization of octamethyl-cyclotetrasiloxane with 0.01 percent by weight of KOH there is prepared in known manner an α,ω-dihydroxy-polydimethyl siloxane of about 3000 cs. viscosity (20° C.). From the latter and from the same methyl-poly-siloxane resin as described in Example 1, a solution in toluene is prepared containing 25 percent by weight each of α,ω-dihydroxy-polydimethyl siloxane and methyl-polysiloxane resin. Boric acid is added thereto in a quantity of 1 percent of the total weight of methyl siloxanes and the mixture is heated to the boil under reflux for about one hour.

60 parts by weight of the solution thus obtained are mixed with 1 part by weight of polyvinyl alcohol, 0.5 part by weight of dioctyl-tin-dimaleate and 39 parts by weight of water and an emulsion is prepared therefrom in a conventional emulsifying apparatus and diluted with water to a solid content between 5 and 10 percent by weight before being applied to paper.

When parchment paper, imitation parchment paper and soda kraft paper is treated with this emulsion in an analogous manner to that described in Example 1 for the case of a solution, the same result is obtained.

*Example 3*

An α,ω-dihydroxy-polymethyl hydrogen siloxane oil of a viscosity between 10 and 50 cs. (20° C.) is prepared in known manner by hydrolysis of monomethyl dichlorosilane with water. Furthermore there is prepared from a mixture of 1 mol each of methyl-trichlorosilane, dimethyl dichloro-silane, phenyl-trichlorosilane and diphenyl-dichlorosilane in known manner by hydrolysis an organopolysiloxane resin which is dissolved in an equal amount of toluene. 70 parts of this solution are mixed with 15 parts of the α,ω-dihydroxy-polymethyl hydrogen siloxane oil and a further 15 parts by weight of toluene. 1.5 parts by weight of propylboroxole are added to this mixture which is stirred until a clear solution is obtained and which, before being applied to paper, is mixed with 1.5 parts by weight of tin dioctoate and diluted with toluene to a solid content between 5 and 10 percent by weight.

The coating of paper is carried out as described in Example 1 leading to the same advantageous result.

We claim:

1. In the process for preparing siloxane-coated separating papers by applying to the paper a mixture which contains
   (a) between 1 and 70 parts by weight of an essentially linear organopolysiloxane containing terminal hydroxyl groups bound to silicon and having the formula

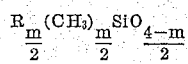

wherein R is a member selected from the group consisting of hydrogen and hydrocarbon radicals and $m$ has a value of from 1.9–2.1;
   (b) between 99 and 30 parts by weight of an organopolysiloxane having the formula

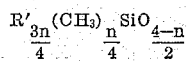

wherein R' is a hydrocarbon radical and $n$ has a value of from 0.5–1.5; and
   (c) between 0.1 and 10% of the total of the weight of (a) + (b) of a curing catalyst, drying and heating the coated paper at a temperature of 100–150° C.; the improvement which comprises incorporating in said mixture between 0.1–10% of the total of the weight of (a) + (b) of a boron compound selected from the group consisting of boron oxide, boric acid, boric acid alkyl esters, alkylboric acid alkyl esters having the formula $R''_aB(OR''')_{3-a}$, and alkyl boroxoles having the formula $(R''BO)_3$ wherein $R''$ and $R'''$ each represent lower alkyl radicals and $a$ is an integer from 1 to 2.

2. Improvement according to claim 1, which comprises in the first step preparing a mixture of the organosiloxanes and boron compound, heating this mixture to a temperature of between 80 and 150° C. for a time sufficient to dissolve the boron compounds, cooling the resulting mixture and thereafter adding the curing catalyst.

3. Process for preparing siloxane coated separating papers which comprises the steps of applying to the paper a composition comprising
   (a) 70 parts by weight of a methyl polysiloxane resin,
   (b) 30 parts by weight of α,ω-dihydroxy-polyphenyl methyl siloxane,
   (c) 3 parts by weight of propyl boric acid di-n-amyl ester, and
   (d) 3 parts by weight of dibutyl-tin-dilaurate, drying and heating the coated paper at a temperature between 120 and 130° C.

4. Process for preparing siloxane coated separating papers, which comprises applying to the paper a composition comprising
   (a) 60 parts by weight of a solution comprising 25% by weight of α,ω-dihydroxy-polydimethylsiloxane having a viscosity of about 3000 cs. (20° C.), 25% by weight of a methyl polysiloxane resin, 0.5% boric acid and the balance solvent,
   (b) 1 part by weight of polyvinyl alcohol and
   (c) 0.5 part by weight of dioctyl-tin-dimaleate,
drying and heating the coated paper at a temperature between 120 and 130° C.

5. Process for preparing siloxane coated separating papers which comprises applying to the paper a composition comprising
   (a) 15 parts by weight of α,ω-dihydroxy-polymethyl-hydrogen siloxane oil having a viscosity of between 10 and 50 cs. (20° C.), (b) 70 parts by weight of a 50% solution of an organopolysiloxane resin,
(c) 1.5 parts by weight of propyl boroxole and
(d) 1.5 parts by weight of tin-dioctoate, drying and heating the coated paper at a temperature of between 120 and 130° C.

References Cited by the Examiner
UNITED STATES PATENTS

| | | | |
|---|---|---|---|
| 2,442,613 | 6/48 | Nicodemus | 260—42 |
| 2,495,306 | 1/50 | Zurcher | 260—42 |
| 2,807,601 | 9/57 | Dennett | 260—42 |
| 2,842,521 | 7/58 | Nitzche et al. | 117—161 |
| 2,985,544 | 5/61 | De Monterey et al. | 117—155 X |
| 2,985,545 | 5/61 | Leavitt | 260—42 |
| 3,046,160 | 7/62 | Dengler | 117—155 |
| 3,061,567 | 10/62 | Keil | 117—155 X |
| 3,070,559 | 12/62 | Nitzsche et al. | 260—42 |
| 3,070,560 | 12/62 | Metevia | 260—42 |

FOREIGN PATENTS 804,198  11/58  Great Britain.

WILLIAM D. MARTIN, *Primary Examiner.*
MURRAY KATZ, *Examiner.*